(12) United States Patent
Al-Azzawe et al.

(10) Patent No.: US 6,938,219 B2
(45) Date of Patent: Aug. 30, 2005

(54) METHOD AND SYSTEM FOR DISPLAYING ACTIONS AND HISTORICAL CONTENT IN AN OUTPUT VIEW

(75) Inventors: Abdul H. Al-Azzawe, San Jose, CA (US); Tanya Couch, San Jose, CA (US); Debbani Kundu, Milpitas, CA (US); Constance J. Nelin, Austin, TX (US); Frederick T. Sharp, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/056,559

(22) Filed: Jan. 25, 2002

(65) Prior Publication Data

US 2003/0142146 A1 Jul. 31, 2003

(51) Int. Cl.⁷ ................................................ G06F 3/14
(52) U.S. Cl. ...................... 715/854; 715/804; 715/966; 715/772
(58) Field of Search ........................ 345/763, 780; 715/854, 966, 763, 780, 804, 781, 809, 808, 772, 771, 853, 855, 810, 821, 822, 841, 843

(56) References Cited

U.S. PATENT DOCUMENTS

| | | |
|---|---|---|
| 5,392,387 A | 2/1995 | Fitzpatrick et al. |
| 5,500,929 A | 3/1996 | Dickinson |
| 5,515,488 A | 5/1996 | Hoppe et al. |
| 5,559,946 A | 9/1996 | Porter |
| 5,563,994 A | 10/1996 | Harmon et al. |
| 5,590,264 A | 12/1996 | Keane et al. |
| 5,621,880 A | 4/1997 | Johnson |
| 5,818,449 A | 10/1998 | Myers |
| 6,049,334 A | 4/2000 | Bates et al. |
| 6,064,384 A | 5/2000 | Ho |
| 6,073,108 A | 6/2000 | Peterson |
| 6,489,971 B1 * | 12/2002 | Miller et al. ................. 345/763 |
| 6,493,743 B2 * | 12/2002 | Suzuki ........................ 709/203 |
| 6,496,202 B1 * | 12/2002 | Prinzing ..................... 345/762 |
| 6,501,490 B1 * | 12/2002 | Bell ............................ 345/837 |
| 6,509,912 B1 * | 1/2003 | Moran et al. ................ 345/762 |

FOREIGN PATENT DOCUMENTS

JP          9325878          12/1997

OTHER PUBLICATIONS

United States Patent & Trademark Office, East Text Search Training, Jan. 2000, 1–120.*

* cited by examiner

*Primary Examiner*—Raymond J. Bayerl
(74) *Attorney, Agent, or Firm*—Sawyer Law Group LLP

(57) ABSTRACT

A method and system for tracking a plurality of actions against at least one object by a computer system is disclosed. The method and system comprises providing an output view, wherein the output view includes a first output area and a second output area. An action list containing each of the plurality of actions is displayed in one of the first and second output areas. A user is allowed to select one action from the action list, and information associated with the selected action is displayed in the other of the first and second output areas.

44 Claims, 7 Drawing Sheets

METHOD AND SYSTEM FOR DISPLAYING ACTIONS AND HISTORICAL CONTENT IN AN OUTPUT VIEW

FIELD OF THE INVENTION

The present invention relates to a method and system for displaying information by a computer system, and more particularly to displaying information related to a plurality of previous and concurrent actions performed against a plurality of objects.

BACKGROUND OF THE INVENTION

Graphical user interface applications are available that guide a user in performing certain actions or tasks against objects in a computer system. For example, Development Center® is an application developed by International Business Machines Corporation, of Armonk, N.Y., which provides a graphical user interface that guides the user in building and testing database applications and objects. Such applications generally provide an output area, known as an output view, in which the user can view information related to the action requested. FIG. 1 illustrates an output view 12 corresponding to the user's request to build (action) Couch- .Proc1 (object) As is shown, the output view contains a plurality of messages 14 that inform the user of the status of the action, eventually indicating that the action is "successful."

The action against an object may produce a simple status message, such as that in FIG. 1, a result based on the action, and/or parameters including data that was input to the object or returned from the object in response to the action. For each new action, previous information contained in the output view is discarded. For the same action, messages are appended to preceding messages, but for another action or a repetition of the previous action, new results and parameters replace those preceding. Thus, once the user submits a new action, the user cannot access the information related to preceding actions. In order to preserve output data associated with an action, the user must execute extra steps, such as cutting and pasting the output data for the action into a clipboard, or otherwise saving the output data in a file.

In addition, problems arise when multiple actions against one or more objects are executed concurrently. In that situation, the output view either is unable to display multiple action results and messages, or produces interleaved information. In either case, the output view is of diminished value to the user.

Accordingly, a need exists for a system and method for letting the user execute and track more than one action concurrently, as well as access the results of previous actions against an object. The user should be able to retrieve not only the output data related to such previous actions, but also the parameters and the status of such actions. Moreover, a need exists for a system and method for organizing output data by actions against particular objects for easy retrieval of historical output and status. The present invention addresses such a need.

SUMMARY OF THE INVENTION

The present invention is directed to a method and system for tracking a plurality of actions against at least one object by a computer system. The method and system comprises providing an output view, wherein the output view includes a first output area and a second output area. An action list containing each of the plurality of actions is displayed in one of the first and second output areas. A user is allowed to select one action from the action list, and information associated with the selected action is displayed in the other of the first and second output areas.

Through aspects of the present invention, multiple actions against a plurality of objects can be executed and tracked concurrently because each action is represented by a separate entry in the action list. In addition, the method and system of the present invention provides historical content that lets the user examine the information associated with any action on the action list regardless of when that action was submitted or executed.

DETAILED DESCRIPTION

The present invention relates to displaying information, and more particularly to displaying information related to a plurality of previous and concurrent actions performed against a plurality of objects. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
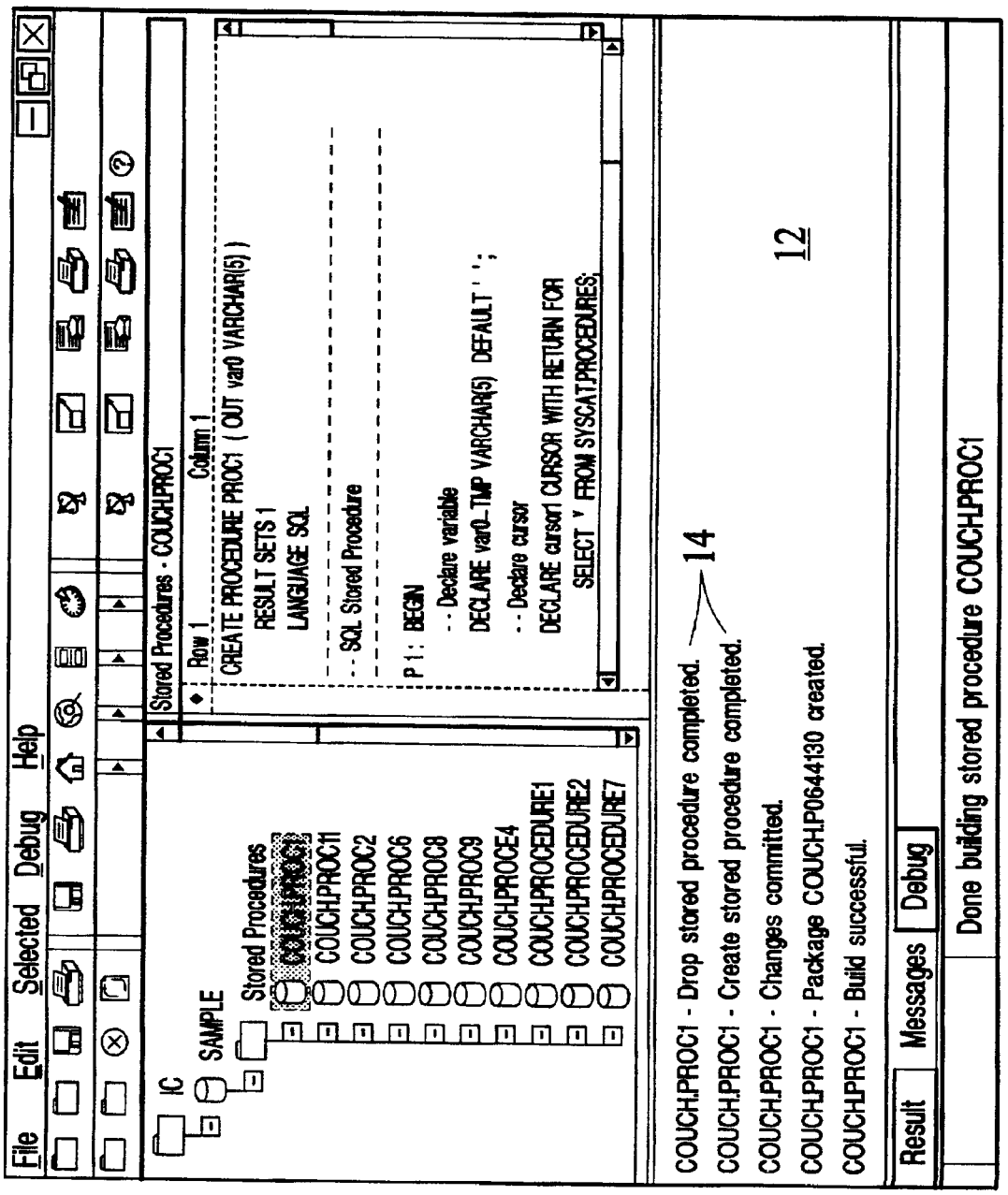
FIG. 1 illustrates an output view for an action submitted by a user.
Figure 2:
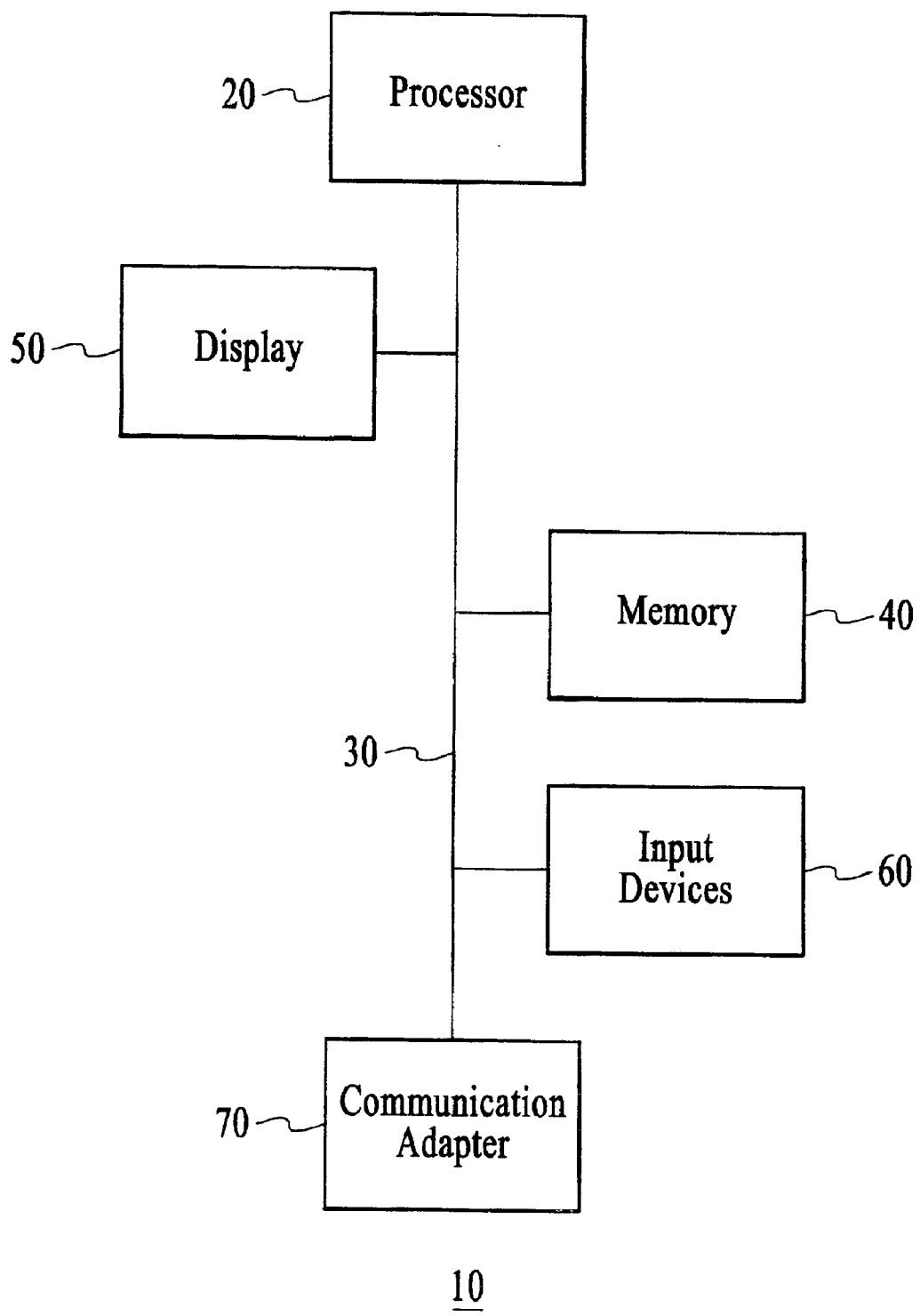
FIG. 2 is a block diagram of a computer system that can be utilized in accordance with a preferred embodiment of the present invention.

FIG. 2 is a block diagram of a computer system 10 that can be utilized in accordance with a preferred embodiment of the present invention. The computer system 10 can be any suitable data processing device, such as a desktop computer or a workstation, and can be in communication with other systems via a network. As is shown in FIG. 2, the computer system 10 includes at least one processor 20 and a number of other components interconnected via a system bus 30. The other components include memory 40, a display 50, input devices 60, such as a keyboard and mouse (not shown), and a communications adapter 70 to facilitate connection to the network (not shown).

Figure 3:
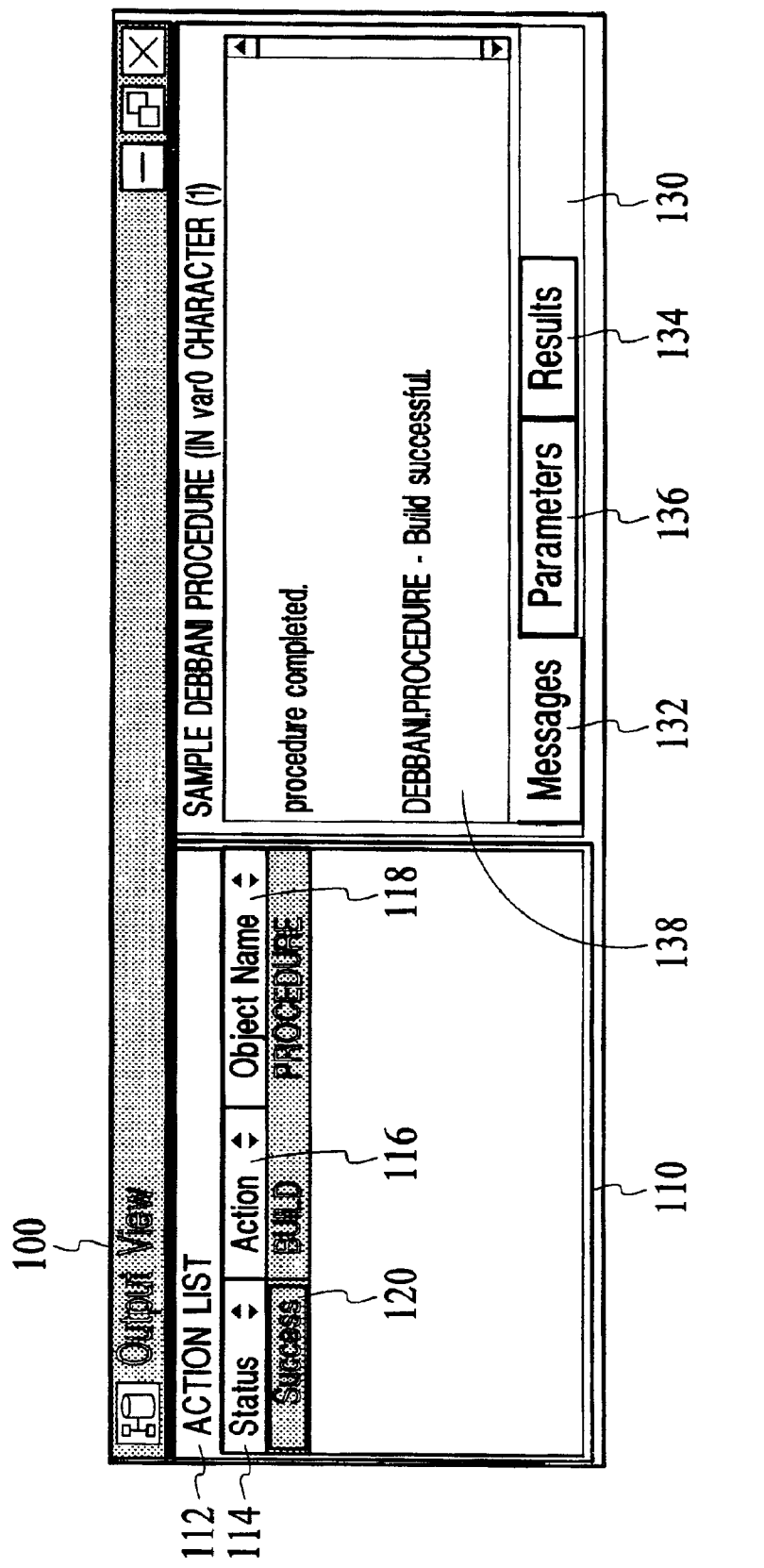
FIG. 3 illustrates an output view in accordance with a preferred embodiment of the present invention.

FIG. 3 illustrates an output view in accordance with the preferred embodiment of the present invention. As is shown, the output view 100 is divided into first and second output areas. The first output area 110 includes an action list 112.

Each time an action is submitted against a given object by the user, an entry is added to the action list 112. The action list 112 indicates the status 114, the action 116, and the object name 118 for each submitted action. The status 114 indicates whether the action is "in progress," "successful," or has not been executed due to an "error." In a preferred embodiment, each status indicator 114 is also associated with an icon 120, such that the user receives visual confirmation, as well as textual information. The action 116 indicates the type of task requested by the user. Typical actions include, but are not limited to, "Build," "Run," and "Open" commands. The object name 118 designates the object against which the action is executed. The object name 118 may include stored procedures, user defined functions, object folders, or the like.

While the preferred embodiment of the action list 112 includes three categories, one skilled in the art would appreciate that other useful categories can be included in the action list 112, such as columns for a start time/date and a end time/date for each action. Such categories would fall within the spirit and scope of the method and system of the present invention.

In a preferred embodiment, the action list can be sorted according to the ascending or descending order of submission, or grouped by status type, action name, or object name. This flexibility allows the user to focus more quickly and easily on the pertinent information, particularly if the action list 112 contains several actions.

The output view in accordance with the preferred embodiment of the present invention also includes a second output area 130. The second output area 130 is used for displaying information associated with each action in the action list 112. As is shown, the second output area 130 includes tabs 132, 134, 136. Each tab represents a type of information related to the action, such as messages 132, result sets 134, and parameters 136. When the user selects one of the tabs 132, 134, 136, the information corresponding to the selected tab 132, 134, 136 is displayed in the second output window 138.

As stated above, when the action is added to the action list 112, the action list 112 displays the name of the object 118, the action that was submitted 116, and the running status 114 of the action. While the action is being executed, the status 114 display changes, indicating the current status and ultimately displaying a "success" or "error" indication as both an icon 120 and text. As a result of executing the action, information related to the action is generated. The actual messages associated with the action are found in the message tab 132, the result of the action, if applicable, in the results tab 134, and the parameters, if applicable, in the parameter tab 136. If a new action is submitted against the same object, a new action list entry is added. The messages 132 or results 134 and parameters 136 for any action performed at any given time can be easily viewed by simply selecting the action of interest in the action list 112.

Figure 4:
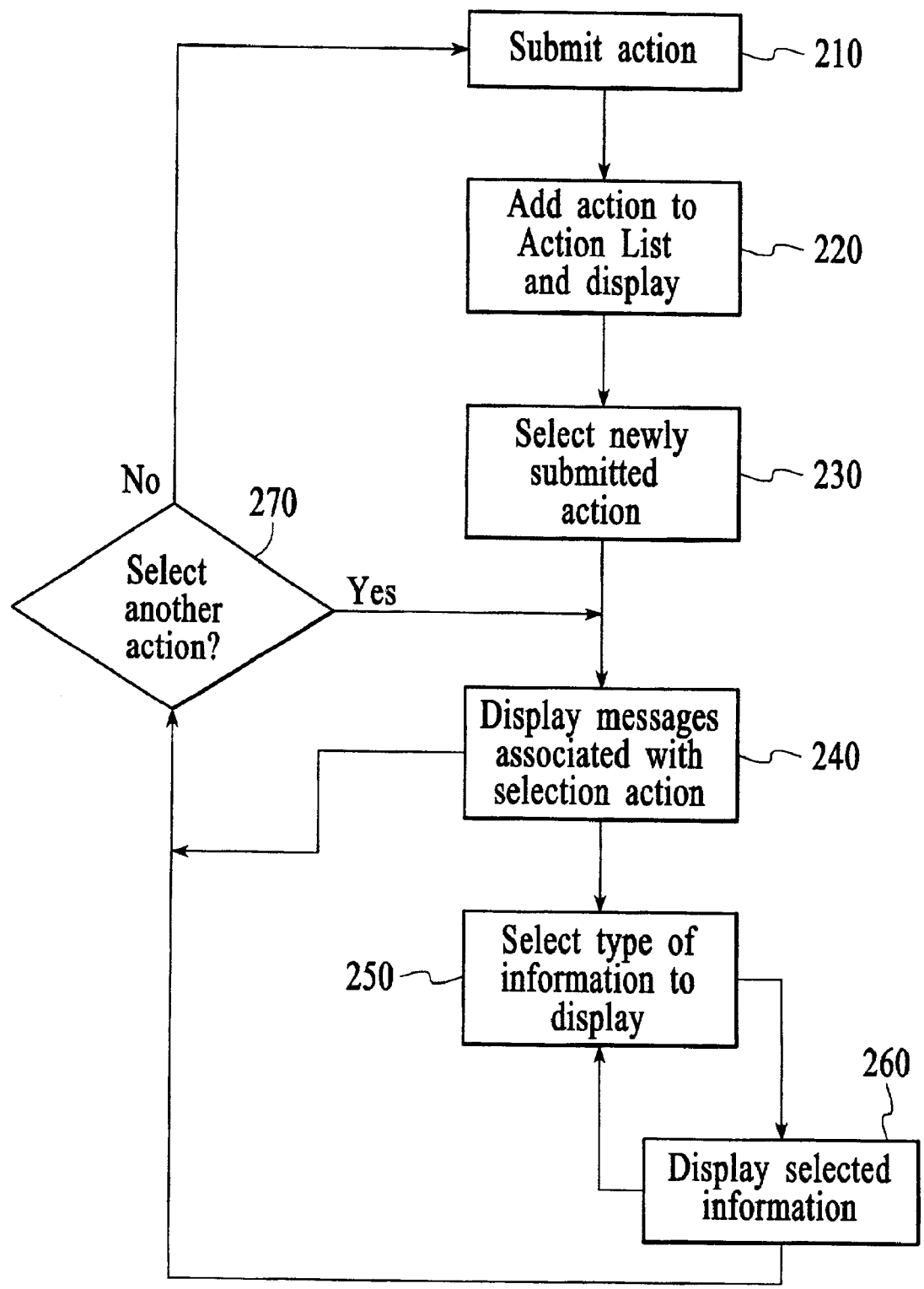
FIG. 4 illustrates a flow chart illustrating the general operation of a preferred embodiment of the present invention.

FIG. 4 is a flow chart illustrating the general operation of the preferred embodiment of the present invention. The process 200 begins when the user submits an action in step 210. Presumably, the action list 112 contains several previously submitted actions. In step 220, the action is added to the action list 112 and displayed to the user in the output view 100. Next, in a preferred embodiment, the newly submitted action is automatically selected on the action list 112 in order to display information related to that particular action in step 230. Once the action is selected, the messages associated with the action are displayed in the second output window 138 in step 240.

Figure 5:
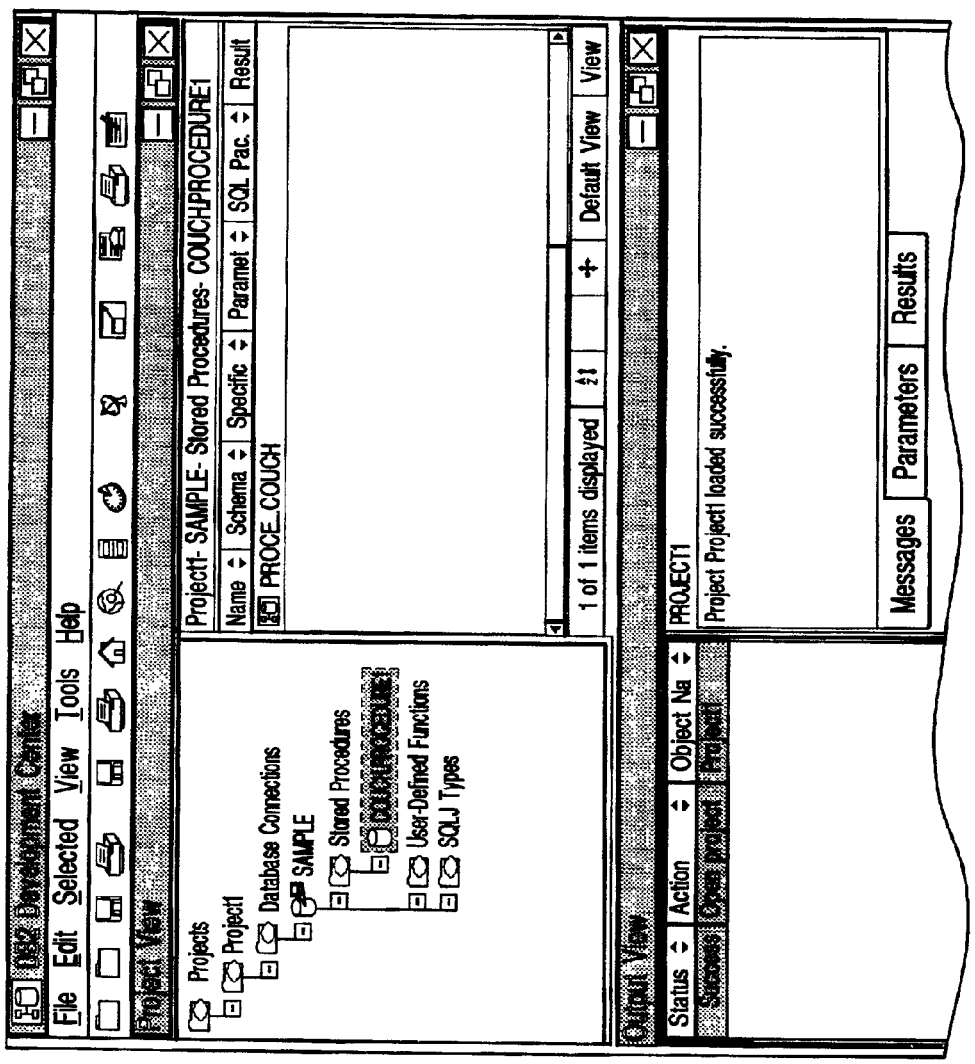
FIG. 5 illustrates an output view with a bolded tab in accordance with a preferred embodiment of the present invention.

At this point, the user may simply select another action (step 270) from the action list 112, or submit another action (step 210), or in step 250, the user may select other types of related information to view, such as results or parameters, if they are available. In some instances, results or parameters or both may not be generated for an action. For instance, an OPEN action, which opens or loads an object, will typically not generate results or parameters. In one preferred embodiment, illustrated in FIG. 5, the tab corresponding to a particular type of information is bolded to indicate that the information has been generated, while the tab corresponding to information not generated is not bolded. Thus, the user is notified of which type of information is available for display.

Referring back to FIG. 4, after the user selects the type of information to view, such information will be displayed, if it is available, in step 260. Next, the user can either select a different type of information to view (step 250), or the user can select another action from the action list 112 (step 270), or the user can submit another action (step 210).

Figure 6:
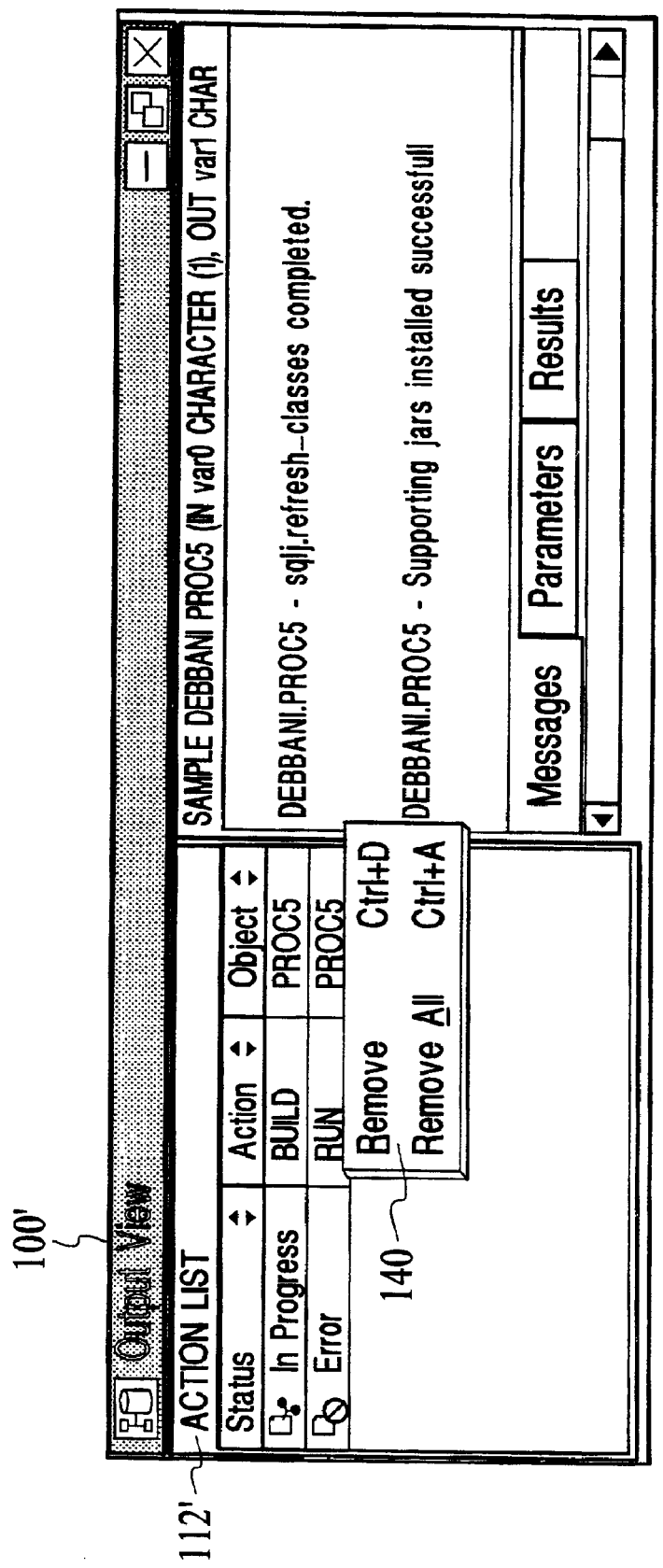
FIG. 6 illustrates an output view with a popup menu for removing one or more actions from the action list in accordance with a preferred embodiment of the present invention.

In the preferred embodiment of the present invention, each action and its associated information remains in the output view 100 until the user removes it from the action list 112. In one preferred embodiment, illustrated in FIG. 6, a pop-up menu 140 appears in the action list 112', which allows the user to remove a selected action, or to remove all the actions in the action list 112'. Removing the action from the action list 112' deletes the action as well as its associated information, e.g., messages, results and parameters. In another embodiment, the user can set the maximum number of actions on the action list, whereby, once that maximum number is reached, the oldest action is automatically replaced with a newly submitted action. Naturally, those skilled in the art would appreciate that alternative ways of removing an action by the user are available, such as by selecting the action and typing a key, e.g. a "delete" key, on a keyboard. The method and system of the present invention would encompass those alternative removal techniques.

Figure 7:
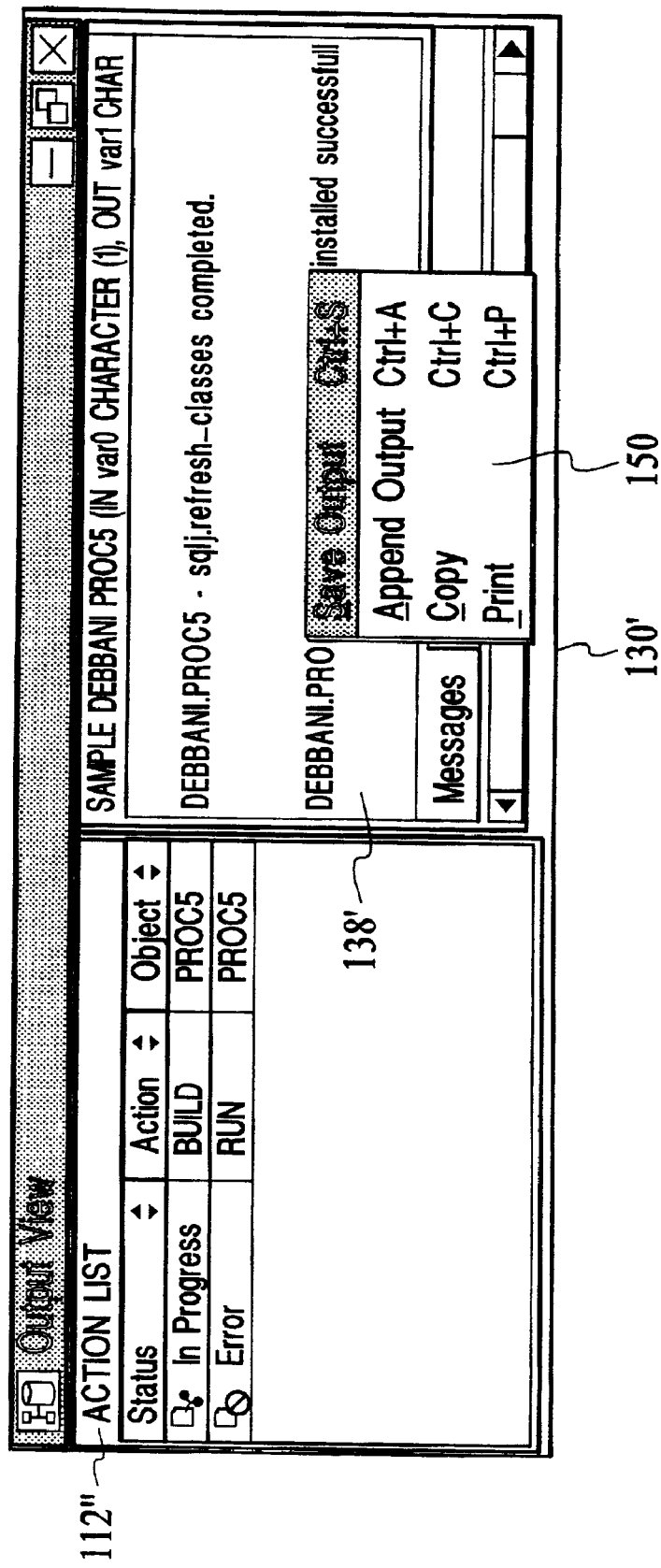
FIG. 7 illustrates an output view with a popup menu for manipulating the content of the output view in accordance with a preferred embodiment of the present invention.

Another feature of a preferred embodiment is illustrated in FIG. 7. Here, the method and system of the present invention allows the user to save, copy, or print the information associated with the selected action. As is shown, two actions are on the action list 112." A "Build" action against object PROC 5 is in progress, while a "Run" action against object PROC 5 was unsuccessful, resulting in an error indictor. A popup menu 150 appears in the second output area 130'. The popup menu 150 allows the user to save, append to a file, copy, or print the content of the second output window 138'.

By utilizing the preferred embodiment of the method and system of the present invention, multiple actions against a plurality of objects can be executed and tracked concurrently because each action is represented by a separate entry in the action list 112. Thus, one or more actions can be in various stages of execution (both having a status of "in progress"), and the user can monitor the one or more actions simultaneously in the output view. In addition, the method and system of the present invention provides historical content that allows the user to examine the information associated with any action on the action list regardless of when that action was submitted or executed. Displaying information from one action to another is as simple as selecting the action of interest.

Although the present invention has been described in accordance with the embodiments shown, one of ordinary skill in the art will readily recognize that there could be variations to the embodiments and those variations would be within the spirit and scope of the present invention. For instance, while certain types of actions and certain types of associated information for an action have been discussed, the method and system of the present invention is by no means limited to those actions and types of associated information. Additional types of associated information may be beneficial for the user's examination, and those types of associated information would fall within the scope of the present invention. Accordingly, many modifications may be made by one of ordinary skill in the art without departing from the spirit and scope of the appended claims.

What is claimed is:

1. A method for tracking a plurality of actions against at least one object by a computer system, the method comprising the steps of:
    (a) providing an output view, wherein the output view includes a first output area and a second output area;
    (b) listing each of the plurality of actions in an action list output area and a second output area;
        (b1) displaying an action description for each action in the action list;
        (b2) displaying a running status of each action in the action list; and
        (b3) displaying a name of an object against which each action in the action list is directed;
    (c) allowing a user to select one action from the action list; and
    (d) displaying information associated with the selected action in the other of the first and second output areas.

2. The method of claim 1, wherein at least two of the plurality of actions are executed concurrently.

3. The method of claim 2, wherein the listing step (b) further includes the steps of:
    (b4) displaying a start timestamp for each action in the action list; and
    (b5) displaying an end timestamp for each action in the action list.

4. The method of claim 3 further including the step of:
    (e) sorting the action list according to one of the start timestamp and the end timestamp of each action on the action list.

5. The method of claim 2, wherein the step of displaying the running status (b2) further includes the steps of:
    (b2i) presenting a textual description of the running status; and
    (b2ii) providing a visual description of the running status.

6. The method of claim 2, wherein the listing step (b) further includes the step of:
    (b4) entering a new action to the action list when the user has submitted the new action against an object.

7. The method of claim 2 further including the step of:
    (e) sorting the action list by one of the action description, the running status and the object name.

8. The method of claim 2, wherein the information associated with the selected action includes a message, an associated result, and at least one parameter.

9. The method of claim 8, wherein the step of displaying (d) further includes the step of:
    (d1) allowing the user to select one of the message, the associated result, and the at least one parameter for the selected action; and
    (d2) repeating step (d1) until the user is satisfied.

10. The method of claim 9 including the step of:
    (e) repeating steps (c) and (d) until the user is satisfied.

11. The method of claim 10, further including the step of:
    (f) allowing the user to print, save, copy, and append to a file the information associated with the selected action.

12. The method of claim 1 further including the step of:
    (e) allowing the user to remove at least one of the actions from the action list.

13. The method of claim 12, wherein the step of removing the at least one acton (e) further includes:
    (e1) setting maximum number of actions in the action list; and
    (e2) replacing a least recent action in the action list with a new action when the maximum number of actions has been reached.

14. The method of claim 12, wherein the step of removing the at least one action (e) further includes:
    (e1) selecting an action for removal; and
    (e2) providing a popup menu to the user, wherein the popup menu allows the user to remove the selected action.

15. The method of claim 12, wherein the step of removing the at least one action (e) further includes:
    (e1) selecting an action for removal; and
    (e2) pressing a predefined key on a keyboard to delete the selected action.

16. A computer readable medium containing programming instructions for tracking a plurality of actions against at least one object by a conputer system, comprising the instructions for:
    (a) providing an output view, wherein the output view includes a first output area and a second output area;
    (b) listing each of the plurality of actions in an action list in one of the first and second output areas, wherein the listing instruction (b) further includes instructions for:
        (b1) displaying an action description for each action in the action list;
        (b2) displaying a running status of each action in the action list; and
        (b3) displaying a name of an object against which each action in the action list is directed;
    (c) allowing a user to select an action from the action list; and
    (d) displaying information associated with the selected action in the other of the first and second output areas.

17. The computer readable medium of claim 16, wherein at least two of the plurality of actions are executed concurrently.

18. The computer readable medium of claim 17, wherein the listing instruction (b) further includes instructions for:
    (b4) displaying a start timestamp for each action list; and
    (b5) displaying an end timestamp for each action in the action list.

19. The computer readable medium of claim 18 further including the instructon for:
    (e) sorting the action list according to one of the start timestamp and the end timestamp.

20. The computer readable medium of claim 17, wherein the instruction for displaying the running status (b2) further includes instructions for:
    (b2i) presenting a textual description of the running status; and
    (b2ii) providing a visual description of the running status.

21. The computer readable medium of claim 17, wherein the listing instruction (b) further includes instruction for:
    (b4) entering a new action to the action list when the user has submitted the new action against an object.

22. The computer readable medium of claim 17 further including the instruction for:

(e) sorting the action list by one of the action description, the running status and the object name.

23. The computer readable medium of claim 17, wherein the information associated with the selected action includes a message, an associated result, and at least one parameter.

24. The computer readable medium of claim 23, wherein the instruction for displaying (d) further includes:

(d1) allowing the user to select one of the message, the associated result, and the at least one parameter for the action; and (d2) repeating step (d1) until the user is satisfied.

25. The computer readable medium of claim 24 further including the instruction for:

(e) repeating steps (c) and (d) until the user is satisfied.

26. The computer readable medium of claim 25, further including the instruction for:

(f) allowing the user to print, save, copy, and append to a file the information associated with the selected action.

27. The computer readable medium of claim 16 further including the instruction for:

(e) allowing the user to remove at least one of the actions from the action list.

28. The computer readable medium of claim 27, wherein the instruction for removing the at least one the action (e) further includes:

(e1) setting a maximum number of actions in the action list; and (e2) replacing a least recent action in the action list with a new action when the maximum number of actions has been reached.

29. The computer readable medium of claim 27, wherein the instruction for removing the at least one action (e) further includes:

(e1) selecting an action for removal; and (e2) providing a popup menu to the user, wherein the popup menu allows the user to remove the selected action.

30. The computer readable medium of claim 27, wherein the instruction for removing the at least one action (e) further includes:

(e1) selecting an action for removal; and (e2) pressing a predefined key on a keyboard to delete the selected action.

31. A computer system for tracking a plurality of actions against at least one object comprising:

a display;

at least one processor coupled to the display for providing an output view on the display, wherein the output view includes a first output area and a second output area, and wherein an action list comprising each of the plurality of actions is displayed in one of the first and second output areas and the action list includes an action description, a running status of each action in the action list, and a name of an object against which each action in the action list is directed; and an input device coupled to the processor for allowing a user to select an action from the action list;

wherein the processor causes information associated with the selected action to be displayed in the other of the first and second output areas of the output view.

32. The computer system of claim 31, wherein at least two of the plurality of actions are executed concurrently.

33. The computer system of claim 32, wherein the action list further includes a start timestamp and an end timestamp for each action in the action list.

34. The computer of claim 33, wherein the action list is sorted according to one of the start timestamp and the end timestamp.

35. The computer system of claim 32, wherein the running status includes a textual description and a visual description, wherein the visual description is an icon.

36. The computer system of claim 32, wherein a new action is added onto the action list when the user submits the new action.

37. The computer system of claim 32, wherein the action list is sorted by one of the action description, the running status and the object name.

38. The computer system of claim 32, wherein the information associated with the selected action includes a message, an associated result, and at least one parameter.

39. The computer system of claim 38, wherein the input device allows the user to select one of the message, the associated result, and the at least one parameter for the selected action for display.

40. The computer system of claim 39, wherein the processor allows the user to print, save, copy, and append to the information associated with the selected action.

41. The computer system of claim 31 further including means for allowing the user to remove at least one of the actions from the action list.

42. The computer system of claim 41, wherein the means for allowing the user to remove the at least one action includes means for setting a maximum number of actions in the action list, and means for replacing a least recent action in the action list with a new action when the maximum number of actions has been reached.

43. The computer system of claim 41, wherein the means for removing the at least one action includes the input device for allowing the user to select an action for removal and a popup menu for allowing the user to remove the selected action.

44. The computer system of claim 41, wherein the means for removing the at least one action includes the input device for allowing the user to select an action for removal, and a keyboard with a predefined key for deleting the selected action.

* * * * *

UNITED STATES PATENT AND TRADEMARK OFFICE
CERTIFICATE OF CORRECTION

PATENT NO.    : 6,938,219 B2
DATED         : August 30, 2005
INVENTOR(S)   : Al-Azzawe et al.

Page 1 of 1

It is certified that error appears in the above-identified patent and that said Letters Patent is hereby corrected as shown below:

Column 5,
Line 19, delete "output area and a second output area;" and replace with -- in one of the first and second output areas, wherein the listing step (b) further includes the steps of: --.
Line 63, add -- further -- after "9" and before "including".

Column 6,
Line 9, add -- a -- after "setting" and before "maximum".
Line 27, delete "conputer" and replace with -- computer --.
Line 49, add -- action in the -- after "each" and before "action".

Column 7,
Lines 11 and 12, add -- selected -- after "the" and before "action;".

Column 8,
Line 14, add -- system -- after "computer" and before "of".
Line 34, add -- a file -- after "to" and before "the".

Signed and Sealed this

Twenty-fourth Day of January, 2006

JON W. DUDAS
*Director of the United States Patent and Trademark Office*